(12) United States Patent
Kraus et al.

(10) Patent No.: US 11,858,306 B2
(45) Date of Patent: Jan. 2, 2024

(54) STABILIZER BAR DISCONNECT

(71) Applicant: Schaeffler Technologies AG & Co. KG, Herzogenaurach (DE)

(72) Inventors: Manfred Kraus, Tuchenbach (DE); Florin Dobre, Brasov (RO); Brian Lee, Charlotte, NC (US); Adrian Husu, Brasov (RO); Benjamin Wuebbolt-Gorbatenko, Erlangen (DE); Mihai Achim, Brasov (RO); Marius-Constantin Costache, Malaestii de Jos (RO); Mihaly Kovacs, Sf. Gheorghe (RO)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/843,234

(22) Filed: Jun. 17, 2022

(65) Prior Publication Data

US 2023/0060076 A1   Feb. 23, 2023

Related U.S. Application Data

(60) Provisional application No. 63/235,211, filed on Aug. 20, 2021.

(51) Int. Cl.
  *B60G 21/055*   (2006.01)
(52) U.S. Cl.
  CPC .... *B60G 21/0556* (2013.01); *B60G 2202/135* (2013.01); *B60G 2202/42* (2013.01)
(58) Field of Classification Search
  CPC .......... B60G 2202/135; B60G 21/0555; B60G 21/0556; B60G 2206/427; B60G 2202/42
  (Continued)

(56) References Cited

U.S. PATENT DOCUMENTS 6,860,167 B2 *   3/2005   Schmidt ................ F15B 15/068
                                                        74/56
8,118,314 B2 *   2/2012   Ersoy ................. B60G 21/0556
                                                        280/124.152

(Continued)

FOREIGN PATENT DOCUMENTS

EP   1275535 A2   1/2003
JP   2011031734 A   2/2011
WO   2004037571 A1   5/2004

OTHER PUBLICATIONS

Author: American Axle and Manufacturing Source: American Axle and Manufacturing Announces SmartBar Application for Jeep Rubicon Date: Jan. 9, 2007 Country: United States Retrieved from https://www10.mcadcafe.com/nbc/articles/view_article.php?articleid=233626&section=CorpNews on Feb. 3, 2022.

(Continued)

*Primary Examiner* — Drew J Brown
*Assistant Examiner* — Caitlin Anne Miller

(57) ABSTRACT

A stabilizer bar has a first connected position and a second disconnected position. One side-bar is fixed to a housing while the other side-bar is fixed to a tulip within the housing. The housing has a plurality of axial grooves. The tulip defines a plurality of slots which are aligned with the grooves when the vehicle is level. A nut has a plurality of pins that extend radially such that the nut is torsionally coupled to the housing. In a first connected position, the pins fit within the slots of the tulip to torsionally couple the nut and the housing to the tulip. To facilitate a second disconnected position, a motor driven actuator moves the nut axially such that the pins no longer engage the slots. When motor power is withdrawn, a spring pushes the nut back to the first connected position.

20 Claims, 6 Drawing Sheets

(58) Field of Classification Search
USPC .................................................. 280/124.106
See application file for complete search history.

(56) References Cited

U.S. PATENT DOCUMENTS

| | | | |
|---|---|---|---|
| 10,752,077 B2* | 8/2020 | Park | ........................ F16D 11/14 |
| 2009/0058020 A1 | 3/2009 | Ersoy et al. | |
| 2011/0037239 A1* | 2/2011 | Mori | .................. B60G 21/0555 |
| | | | 280/124.106 |
| 2019/0184784 A1 | 6/2019 | Park | |

OTHER PUBLICATIONS

Author: BWI Group Source: Active Stabilizer Bar Systems Country: United States Retrieved from https://www.bwigroup.com/active-stabilizer-bar-systems/ on Feb. 3, 2022.

* cited by examiner

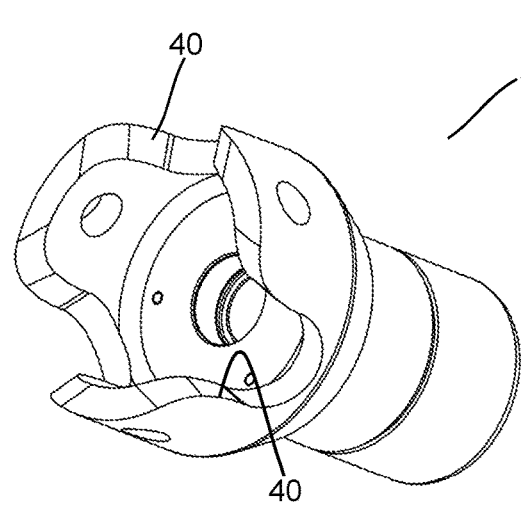 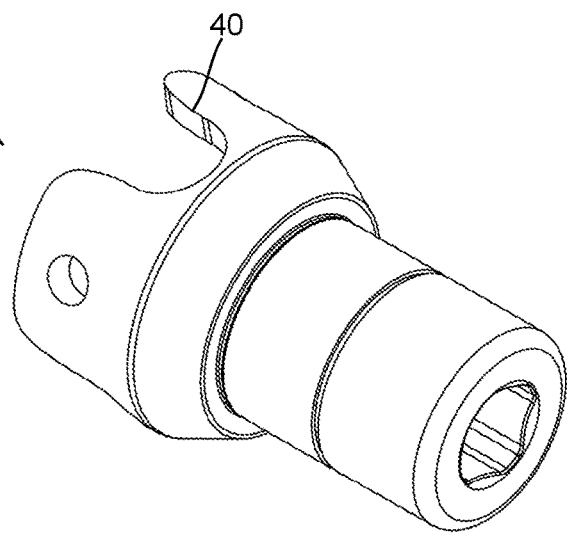
Figure 6AFigure 6B
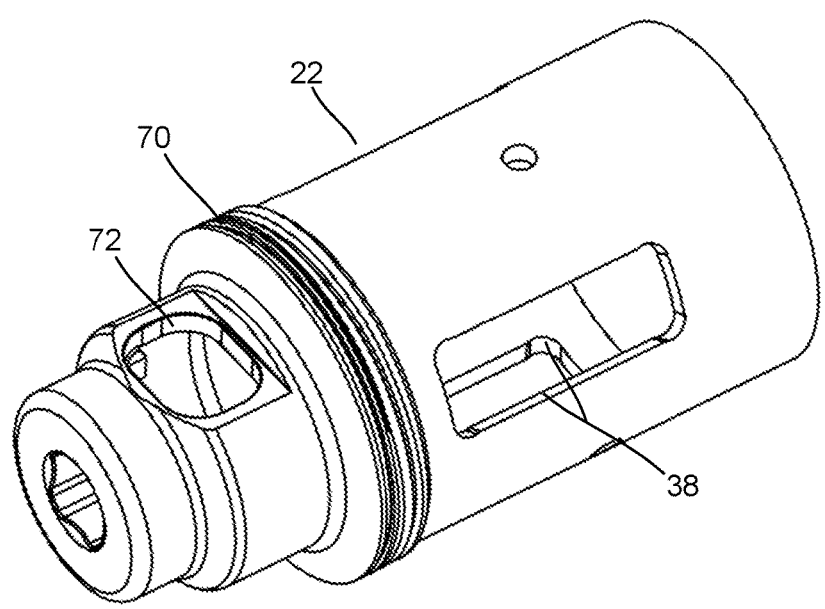
Figure 7

STABILIZER BAR DISCONNECT

CROSS-REFERENCE TO RELATED APPLICATIONS

This application claims priority to U.S. Provisional Application 63/235,211 filed Aug. 20, 2021, the entire disclosure of which is incorporated by reference herein.

TECHNICAL FIELD

The disclosure concerns a stabilizer bar for a vehicle. More particularly, the disclosure concerns a stabilizer bar which can be disconnected for improved off-road performance.

BACKGROUND

Many modern vehicle suspensions include stabilizer bars. Stabilizer bars can equalize a vertical movement of the left and right wheels relative to the vehicle frame or body. However, in some situations it can be desirable to have large vertical movement of a wheel on one side of the vehicle without a corresponding vertical movement on the other side. Independent movement of left and right wheels is helpful for keeping wheels on the ground and providing clearance over obstacles.

SUMMARY

A vehicle stabilizer includes first and second side-bars, a housing, a tulip, a nut, and an actuator. The housing is fixed to the first side-bar and defines two or more axial grooves. The tulip is fixed to the second side-bar and defines two or more open-ended axial slots. The actuator is configured to move the nut axially within the housing between a first connected position and a second disconnected position. The nut has two or more pins, and each one of the pins correspond with one of the two or more axial grooves. In the first connected position, each one of the pins extend radially into the one of the axial slots to selectively torsionally couple the housing to the tulip so that the first side-bar is torsionally coupled to the second side-bar. In the second disconnected position, each one of the pins is moved out of an axial slot so that the first side-bar is torsionally uncoupled from the second side-bar.

In an example embodiment, the vehicle stabilizer also includes a spring that is configured to bias the nut and the pins toward the first connected position.

In an example embodiment, the vehicle stabilizer also includes a cover extending radially over the housing and a seal arranged between the cover and the tulip.

In an example embodiment, the actuator is a ball screw actuator comprising a stator fixed to the housing, a rotor, a threaded rod fixed to the rotor, and a set of balls engaging threads of the threaded rod and internal threads of the nut.

In an example embodiment, the housing becomes torsionally uncoupled from the tulip when the two pins move through an open end of the open-ended axial slots.

In an example embodiment, the actuator is a ball screw actuator that includes a stator fixed to the housing, a rotor, a threaded rod fixed to the rotor, and a set of balls engaging threads of the threaded rod and internal threads of the nut.

In an example embodiment, a method of operating the vehicle stabilizer includes: providing electrical power to the stator to transition from the first connected position to the second disconnected position; and, withdrawing electrical power from the stator to transition from the second disconnected position to the first connected position.

In an example embodiment, in the first connected position, the pins are in a first radial position and a first axial position relative to a rotational axis of the disconnect unit; and in the second disconnected position, the pins are in the first radial position and a second axial position. Stated otherwise, the pins can be configured to move along a path parallel to the rotational axis while maintaining a radial position.

In an example embodiment, the slots of the tulip are arranged non-symmetrically in a circumferential direction around the rotational axis. Stated otherwise, for an arrangement with three slots, an angle between a first slot and a second slot is not equal to an angle between the second slot and a third slot, with the second slot arranged circumferentially between the first and third slots.

In an example embodiment, the pins are disposed on the nut and the pins extend outward in a radial direction relative to the rotational axis. In a further aspect, the nut is actuated by the electric motor via a ball screw drive.

BRIEF DESCRIPTION OF THE DRAWINGS

FIGS. 6A and 6B are perspective views of a tulip of the disconnect unit.

FIG. 7 is a perspective view of a housing of the disconnect unit.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
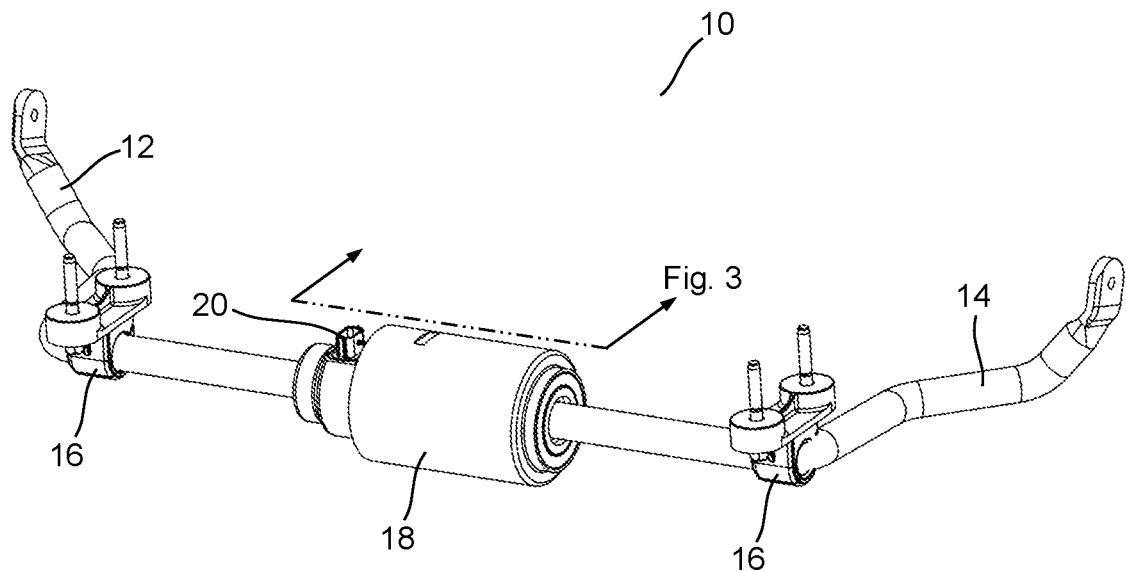
FIG. 1 is a perspective view of a stabilizer bar with a disconnect unit in a first connected position.
Figure 2:
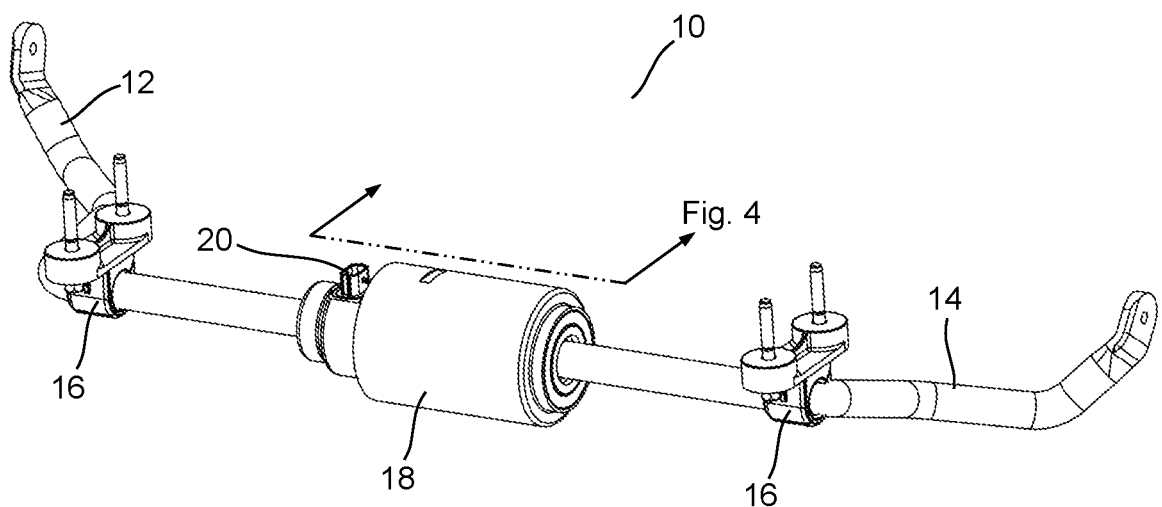
FIG. 2 is a perspective view of the stabilizer bar and disconnect unit of FIG. 1 in a second disconnected position.
Figure 3:
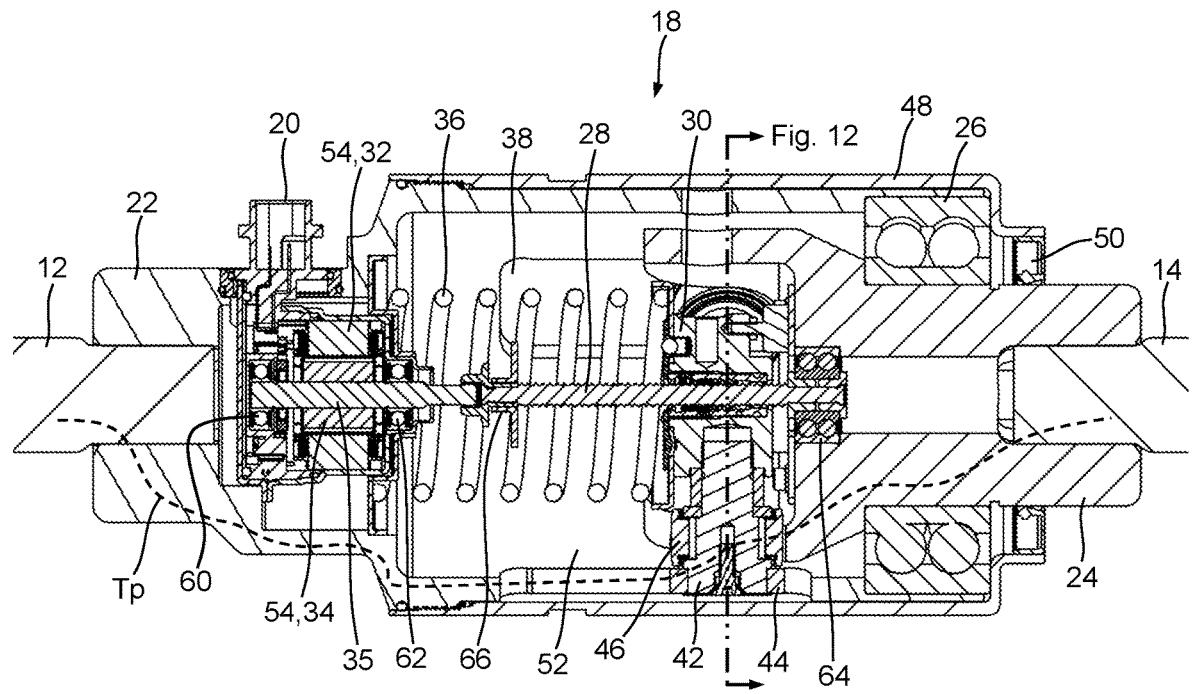
FIG. 3 is a cross-sectional view taken from FIG. 1 that shows the disconnect unit in the first connected position.
Figure 4:
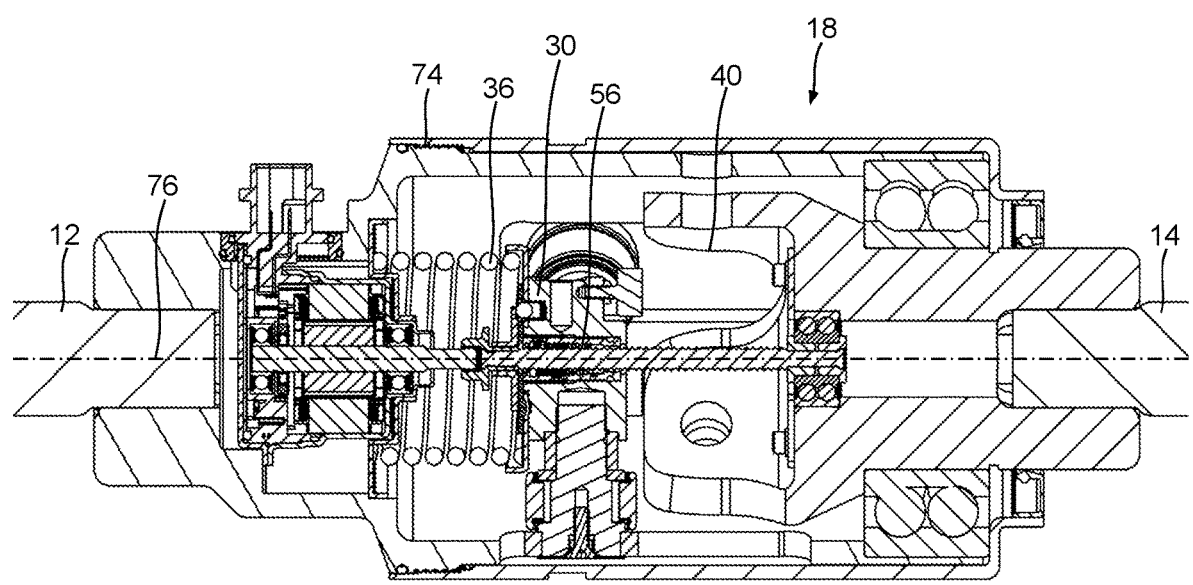
FIG. 4 is a cross-sectional view taken from FIG. 2 that shows the disconnect unit in the second disconnected position.
Figure 5:
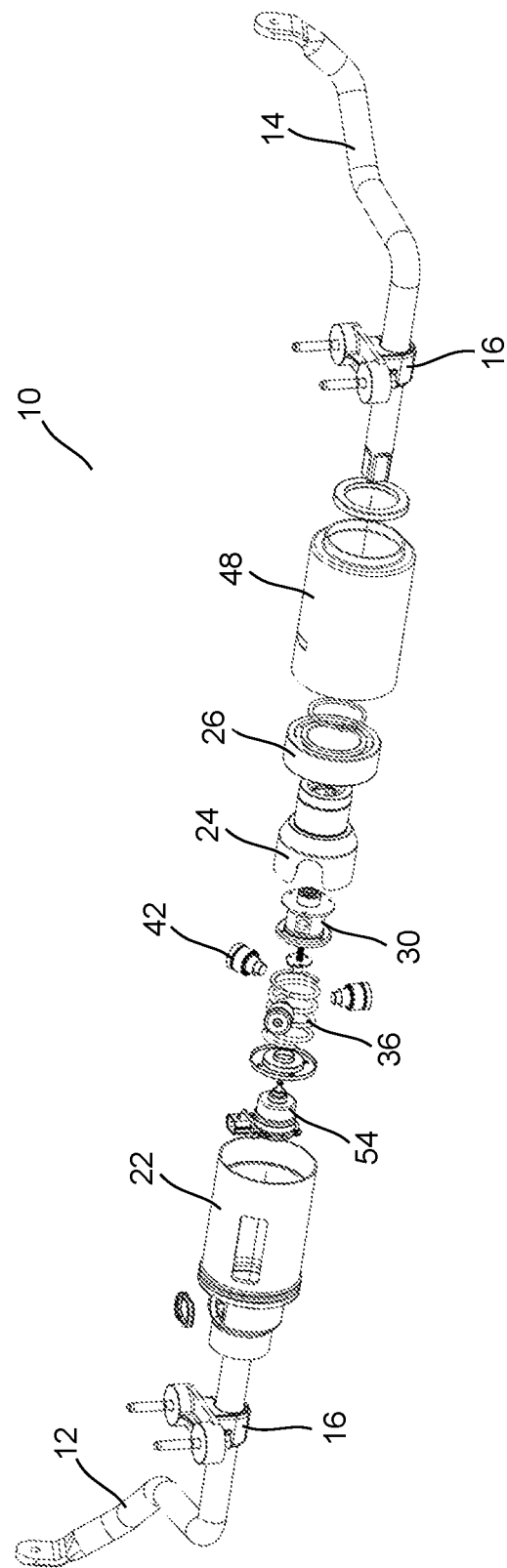
FIG. 5 is an exploded perspective view of the stabilizer bar and disconnect unit of FIG. 1.
Figure 8:
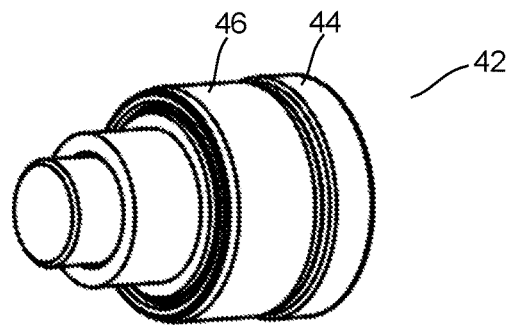
FIG. 8 is a perspective view of a pin of the disconnect unit.
Figure 9:
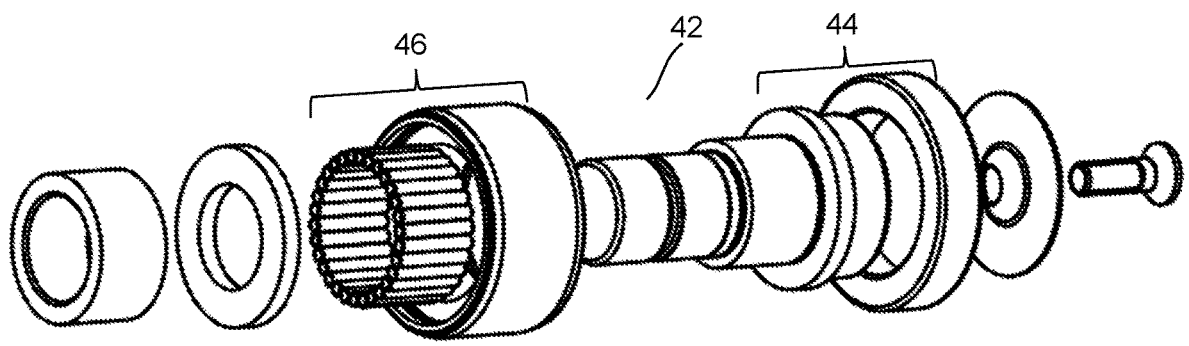
FIG. 9 is an exploded perspective view of the pin of FIG. 8.
Figure 10:
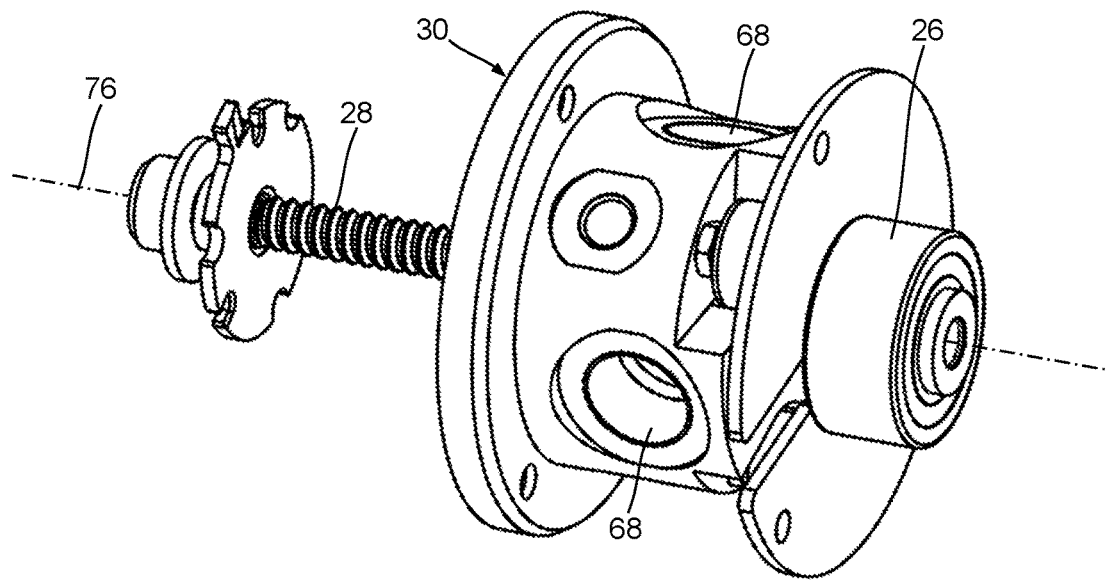
FIG. 10 is a perspective view of a portion of the disconnect unit that includes a nut, a ball screw, and a bearing.
Figure 11:
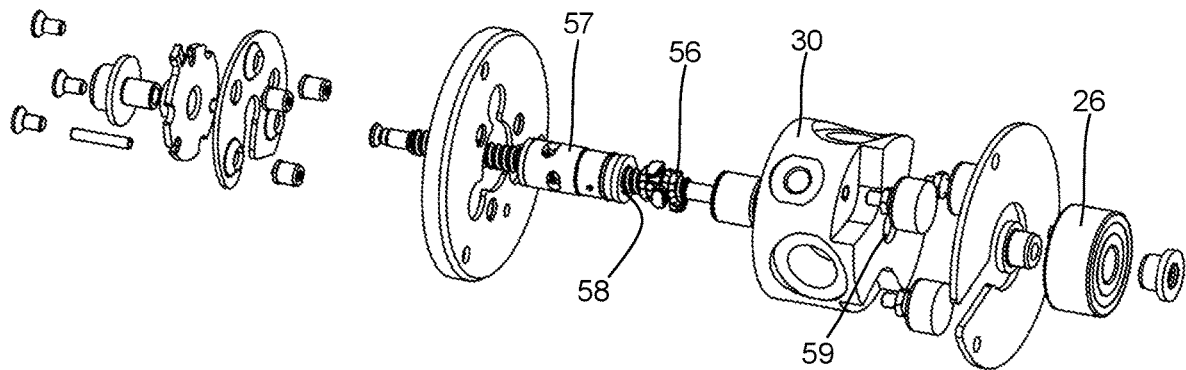
FIG. 11 is an exploded perspective view of the disconnect unit portion of FIG. 10.
Figure 12:
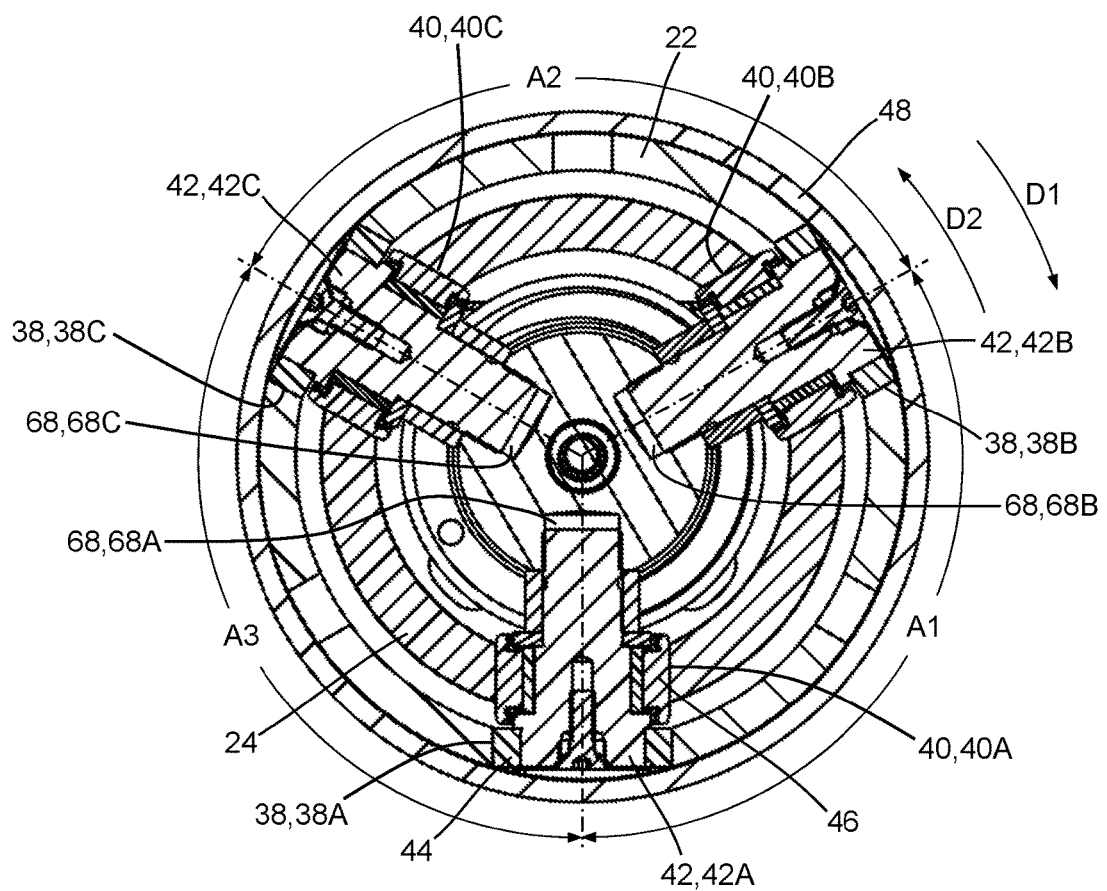
FIG. 12 is a cross-sectional view taken from FIG. 3.

FIG. 1 shows a stabilizer bar 10 with a disconnect unit 18 in a first connected position or state and FIG. 2 shows the stabilizer bar 10 and disconnect unit 18 in a second disconnected position or state. FIGS. 3 and 4 show cross-sectional views of the disconnect unit 18 in the respective first connected position and the second disconnected position. FIG. 5 shows an exploded perspective view of the stabilizer bar 10 and disconnect unit 18. FIGS. 6A and 6B show perspective views of a tulip 24 of the disconnect unit 18. FIG. 7 shows a perspective view of a housing 22 of the disconnect unit 18. FIG. 8 shows a perspective view of a pin 42 of the disconnect unit 18. FIG. 9 shows an exploded perspective view of the pin 42. FIG. 10 shows a perspective view of a portion of the disconnect unit 18 that includes a nut 30, a threaded rod 28, and a bearing 26. FIG. 11 shows an exploded perspective view of the disconnect unit portion of FIG. 10. FIG. 12 is a cross-section view taken from FIG. 3. The following discussion should be read in light of FIGS. 1 through 12.

The stabilizer bar includes a left side-bar 12 and a right side-bar 14. An outboard end of the left side-bar 12 is connected to a left wheel suspension (not shown). Similarly, an outboard end of the right side-bar 14 is connected to a right wheel suspension (not shown). The stabilizer bar 10 is connected to the vehicle frame or body (not shown) by mounting bushings 16. The disconnect unit 18 selectively connects and disconnects inboard ends of the side-bars 12, 14 to one another torsionally. An electrical connector 20 connects to a vehicle wiring harness. Power is supplied via the electrical connector 20 to disconnect the left and right side-bars 12, 14 as discussed below. When the stabilizer bar 10 is in the first connected position or state, vertical displacement of one of the vehicle wheels imposes a torque on the corresponding side-bar. That torque is transmitted to the opposite side-bar and tends to displace the opposite wheel vertically in the same direction, resisting a tendency of the vehicle to tip when rounding a corner. When the stabilizer bar 10 is in the second disconnected position or state, no torque is transmitted via the stabilizer bar 10. The second disconnected position enables each wheel to displace vertically without impacting vertical displacement of the other wheel. A further discussion of how the disconnect unit 18 enables the first connected position and the second disconnected position now follows.

Referring to FIG. 3 which shows the disconnect unit 18 in the first connected position, left side-bar 12 is torsionally coupled or fixed to a hollow housing 22. Right side-bar 14 is torsionally coupled or fixed to a tulip 24 which is supported within the housing 22 by a bearing 26. Therefore, in the first connected position, the left side-bar 12 is torsionally coupled to the right side-bar 14. The bearing 26 serves to align the housing 22 and tulip 24 and also to allow relative rotation between the housing 22 and tulip 24. A ball screw actuator inside the housing includes a threaded rod 28 and a nut 30. A sleeve 57 (see FIG. 11) fixed within a bore 59 of the nut 30 is formed with internal threads 58. A set of balls 56 engage the threaded rod 28 and the internal threads 58 of the sleeve 57 such that the nut 30 moves axially in response to rotation of the threaded rod 28. The motor 54, which can also be referred to as an electronically controlled actuator, includes a stator 32 fixed to the housing 22 and a rotor 34 fixed to a motor shaft 35. The motor shaft 35 is supported by bearings 60, 62 arranged at each end. The motor shaft 35 is coupled to the threaded rod 28 via coupling 66 such that the motor shaft 35 and threaded rod 28 rotate in unison. The threaded rod 28 is supported by a bearing 64 arranged within the tulip 24. In alternative embodiments, other types of actuators, such as lead screws or solenoids, may be used. A compression spring 36 biases the nut 30 to the right with respect to the housing 22 such that the nut 30 is disposed within the tulip 24. The friction imposed by the ball screw actuator is low such that, when no power is provided to the motor 54, the spring 36 pushes the nut 30 to the right causing the threaded rod 28 and the rotor 34 to rotate. The housing 22 defines a set of at least two axial grooves 38 (three in the illustrated embodiment). The tulip 24 defines a set of axial slots 40 (best seen in FIGS. 6A and 6B). The slots 40 are open ended on the left side of the tulip 24. A set of at least two pins 42 extend radially from the nut 30. Each of the pins 42 are disposed within corresponding bores 68 of the nut 30 via a press-fit or a threaded interface. The bores 68 are designed as blind bores, but any suitable bore arrangement is plausible.

The number of pins 42 can be equal to both the number of axial grooves 38 in the housing and the number of slots 40 in the tulip 24. Furthermore, each of the pins 42 can correspond with one of the axial grooves 38 and one of the slots 40. Around each pin 42, an outer bearing 44 engages a corresponding axial groove 38 of the housing 22 and an inner bearing 46 engages a corresponding slot 40 of the tulip 24. The inner and outer bearings 46, 44 facilitate a rotating or non-sliding interface with the respective tulip 24 and housing 22. The bearings could be plain bearings that incorporate bushings or rolling element bearings. In other embodiments the pins 42 could simply slide in with respect to the grooves 38 and slots 40 without such bearings. A torque path Tp is shown in FIG. 3 that illustrates the torsional coupling of the left side-bar 12 to the right side-bar 14. Torque is transmitted from the left side-bar 12 to the housing 22, to the outer bearings 44, to the inner bearings 46, to the tulip 24, and finally, to the right side-bar 14. Torque is transmitted from the right side-bar 14 to the left side-bar 12 through the same sequence of parts in the opposite order. A cover 48 extends over the housing 22 and is sealably fixed to the housing 22 via a threaded interface that includes outer threads 70 of the housing 22 and inner threads 74 of the cover 48. Other suitable means of sealably attaching the cover 48 to the housing 22 are possible, including, but not limited to a welded joint. A seal 50 arranged radially between the cover 48 and the tulip 24 prevents dirt from getting into the housing cavity and prevents grease from getting out of a housing cavity 52 formed by the cover and the housing 22.

FIG. 4 illustrates the disconnect unit 18 in the second disconnected position or state. To enter this second disconnected position, electric power is supplied to the motor 54 via the electrical connector 20 that is disposed within an opening 72 of the housing 22. This causes the rotor 34 and threaded rod 28 to rotate and, in turn, causes the nut 30 to move axially to the left, compressing the spring 36. Once the inner bearings 46 have moved beyond the open end of the slot 40, the torque transmission path is interrupted. In this second disconnected position, the left side-bar 12 can rotate relative to the right side-bar 14.

To transition from the second disconnected position to the first connected position, electric power is withdrawn from the motor 54. The spring 36 pushes the nut 30 back toward the position shown in FIG. 3. If the slots 40 are aligned with the grooves 38, then the transition will occur right away. In some situations, the grooves 38 and slots 40 may not be lined up at the moment that the power is withdrawn. However, the grooves 38 and slots 40 will line up once the vehicle is on a level surface and is not turning. The shape of the open end of the slots 40 may be contoured to facilitate re-engagement. In alternative embodiments, the motor 54 may be commanded to rotate in the opposite direction as opposed to simply being de-energized. It should be stated that a radial position of the pins 42 relative to the rotational axis 76 of the disconnect unit 18 remains the same in both the first connected and second disconnected positions. Furthermore, it is the axial position of the pins 42 relative to the rotational axis 76 of the disconnect unit 18 that changes from the first connected position to the second disconnected position; stated otherwise, the pins 42 move axially along the rotational axis 76 when the disconnect unit 18 changes from the first connected position to the second disconnected position.

FIG. 12 is a cross-sectional view taken from FIG. 3 which shows the radial position of the pins 42 relative to the cover 48, housing 22, and tulip 24 with the disconnect unit in the first connected position. The bores 68 of the nut 30, the axial grooves 38 of the housing 22, and the slots of the tulip 24 can be arranged in various angular configurations to achieve a robust and noise-free assembly. In one example embodiment, the angular span between the respective bores 68, respective axial grooves 38, and respective slots 40 can be equal, or in the illustrated embodiment, equal to 120 degrees.

To address potential torsional lash and resultant noise and/or durability issues, torsionally pre-loaded pins 42 can be achieved by unequal angular spans amongst the circumferential arrays of the bores 68, the respective axial grooves 38, or the respective slots 40. In an example embodiment, three angles A1-A3 that define angular positions of three slots 40A-40C of the tulip 24 are unequal. Such an unequal angle arrangement of the slots 40A-40C can be described as a non-symmetrical arrangement. In a further aspect, a first angle A1 between first and second slots 40A, 40B and a second angle A2 between second and third slots 40B, 40C are configured to be less than 120 degrees and a third angle A3 between the first and third slots 40A, is configured to be greater than 120 degrees. The pins 42 can be pre-loaded via the following installation sequence. The housing 22, nut 30, and tulip 24 can be angularly adjusted so that a first bore 68A, a first axial groove 38A, and the first slot 40A are all aligned, allowing installation of a first pin 42A. A torque can be applied to the tulip 24 or the housing 22 in a first direction to achieve alignment of a second bore 68B, a second axial groove 38B, and a second slot 40B so that a second pin 42B can be installed in the second bore 68B. After the second pin 42B is installed, a torque can be applied to the tulip 24 or the housing 22 in a second direction, opposite the first direction, to achieve alignment of a third bore 68C, a third axial groove 28C, and a third slot 40C so that a third pin 42C can be installed in the third bore 68C. The first, second, and third pins 42A-42C can either be pressed into the corresponding bores 68A-68C or threaded in.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle stabilizer comprising:
   first and second side-bars;
   a housing fixed to the first side-bar, the housing defining at least two axial grooves;
   a tulip fixed to the second side-bar, the tulip defining at least two open-ended axial slots;
   a nut configured to move axially within the housing via an actuator between a first connected position and a second disconnected position, the nut having at least two pins, each one of the at least two pins corresponding with one of the at least two axial grooves; and,
   in the first connected position, each one of the at least two pins extend into one of the at least two open-ended axial slots to selectively torsionally couple the housing to the tulip so that the first side-bar is torsionally coupled to the second side-bar; and
   in the second disconnected position, each one of the at least two pins is moved out of the one of the at least two open-ended axial slots so that the first side-bar is torsionally uncoupled from the second side-bar.

2. The vehicle stabilizer of claim 1 further comprising a spring configured to bias the nut toward the first connected position.

3. The vehicle stabilizer of claim 1 further comprising a cover extending radially over the housing and a seal arranged between the cover and the tulip.

4. The vehicle stabilizer of claim 1 wherein the actuator is a ball screw actuator comprising:
   a stator fixed to the housing;
   a rotor;
   a threaded rod fixed to the rotor; and,
   a set of balls engaging threads of the threaded rod and internal threads of the nut.

5. The vehicle stabilizer of claim 1, wherein each one of the at least two pins further comprises:
   an outer bearing configured to engage the corresponding one of the at least two axial grooves of the housing; and,
   an inner bearing configured to engage one of the at least two open-ended axial slots of the tulip.

6. A vehicle stabilizer comprising:
   first and second side-bars;

a housing fixed to the first side-bar, the housing defining at least two axial grooves;
a tulip fixed to the second side-bar, the tulip defining at least two open-ended axial slots;
a nut configured to move axially within the housing between a first connected position and a second disconnected position, the nut having at least two pins configured to extend radially into the at least two axial grooves and, in the first connected position, extend radially into the at least two open-ended axial slots to selectively torsionally couple the housing to the tulip; and,
a spring configured to bias the nut toward the first connected position.

7. The vehicle stabilizer of claim 6 further comprising an actuator configured to move the nut from the first connected position to the second disconnected position so that each one of the at least two pins moves through an open end of a corresponding one of the at least two open-ended axial slots to torsionally uncouple the housing from the tulip.

8. The vehicle stabilizer of claim 7 wherein the actuator is a ball screw actuator comprising:
a stator fixed to the housing;
a rotor;
a threaded rod fixed to the rotor; and,
a set of balls engaging threads of the threaded rod and internal threads of the nut.

9. A method of operating the vehicle stabilizer of claim 8, the method comprising:
providing electrical power to the stator to transition from the first connected position to the second disconnected position; and,
withdrawing electrical power from the stator to transition from the second disconnected position to the first connected position.

10. The vehicle stabilizer of claim 6 further comprising:
a cover extending radially over the housing; and,
a seal radially arranged between the cover and the tulip.

11. The vehicle stabilizer of claim 6, wherein each one of the at least two pins further comprises:
an outer bearing configured to engage one of the at least two axial grooves of the housing; and,
an inner bearing configured to engage one of the at least two open-ended axial slots of the tulip.

12. A vehicle stabilizer comprising:
first and second side-bars;
a disconnect unit configured to selectively torsionally couple the first and second side-bars, the disconnect unit having:
a rotational axis;
a housing fixed to the first side-bar;
a tulip fixed to the second side-bar;
a plurality of pins moved via an electric motor to selectively torsionally couple the tulip to the housing; and,
in a first connected position of the disconnect unit:
the plurality of pins are configured to torsionally couple the housing to the tulip; and,
the plurality of pins are in a first radial position relative to the rotational axis; and, in a second disconnected position of the disconnect unit:
the plurality of pins are uncoupled from the tulip; and,
the plurality of pins are in the first radial position relative to the rotational axis.

13. The vehicle stabilizer of claim 12, wherein the tulip further comprises a plurality of slots, each one of the plurality of slots corresponding with one of the plurality of pins, and the plurality of slots arranged non-symmetrically in a circumferential direction around the rotational axis.

14. The vehicle stabilizer of claim 12, wherein each one of the plurality of pins extend outward in a radial direction relative to the rotational axis.

15. The vehicle stabilizer of claim 14, wherein the plurality of pins are configured to be moved along a path parallel to the rotational axis.

16. The vehicle stabilizer of claim 12, further comprising a nut, and the plurality of pins are disposed on the nut.

17. The vehicle stabilizer of claim 16, wherein the nut is actuated by the electric motor.

18. The vehicle stabilizer of claim 17, wherein the nut is actuated by the electric motor via a ball screw drive.

19. The vehicle stabilizer of claim 17, further comprising a spring configured to bias the plurality of pins toward the first connected position.

20. The vehicle stabilizer of claim 12, wherein:
in the first connected position of the disconnect unit, the plurality of pins are in a first axial position relative to the rotational axis; and,
in the second disconnected position of the disconnect unit, the plurality of pins are in a second axial position relative to the rotational axis.

* * * * *